United States Patent
Luo et al.

(10) Patent No.: US 11,434,925 B2
(45) Date of Patent: Sep. 6, 2022

(54) TOWER FAN HOUSING ASSEMBLY AND TOWER FAN

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Hanbing Luo, Zhuhai (CN); Yesheng Ling, Zhuhai (CN); Chengyun Lao, Zhuhai (CN); Shuai Zhang, Zhuhai (CN); Xiaopan Mao, Zhuhai (CN); Lulu Zhu, Zhuhai (CN); Lin Cao, Zhuhai (CN); Yaozhen Lu, Zhuhai (CN); Siqi Yuan, Zhuhai (CN); Weichong Huang, Zhuhai (CN)

(73) Assignees: GREE ELECTRIC APPLIANCES (WUHAN) CO., LTD, Hubei (CN); GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 208 days.

(21) Appl. No.: 16/652,598

(22) PCT Filed: Aug. 31, 2018

(86) PCT No.: PCT/CN2018/103383
§ 371 (c)(1),
(2) Date: Mar. 31, 2020

(87) PCT Pub. No.: WO2019/085627
PCT Pub. Date: May 9, 2019

(65) Prior Publication Data
US 2020/0271125 A1 Aug. 27, 2020

(30) Foreign Application Priority Data
Oct. 31, 2017 (CN) .......................... 201711050086.9

(51) Int. Cl.
*F04D 29/40* (2006.01)
*F04D 29/60* (2006.01)
*F04D 29/70* (2006.01)

(52) U.S. Cl.
CPC ......... *F04D 29/403* (2013.01); *F04D 29/601* (2013.01); *F04D 29/703* (2013.01); *F05B 2230/60* (2013.01); *F05B 2240/14* (2013.01)

(58) Field of Classification Search
CPC .. F04D 29/703; F04D 29/626; F05B 2230/60; F05B 2240/14
See application file for complete search history.

(56) References Cited

U.S. PATENT DOCUMENTS 6,344,065 B1 * 2/2002 Boulva ................. B01D 46/543
                                                            55/385.2
6,953,322 B2 * 10/2005 Lim ........................ F04D 17/04
                                                            415/127
(Continued)

FOREIGN PATENT DOCUMENTS

CN        203856746 U        10/2014
CN        105864066 A    *    8/2016  ............. F04D 25/08
(Continued)

OTHER PUBLICATIONS

International Search Report for corresponding International App. No. PCT/CN2018/103383, dated Nov. 29, 2018, 3 pages.

*Primary Examiner* — Kenneth Bomberg
*Assistant Examiner* — Adam W Brown
(74) *Attorney, Agent, or Firm* — Armstrong Teasdale LLP (57) ABSTRACT

A tower fan housing assembly and a tower fan. Herein, the tower fan housing assembly may include a housing body having an opening (11) suitable for taking out a fan wheel inside the housing body, and an air-throughflow part detachably mounted at the opening (11) of the housing body. With the adoption of the tower fan having the tower fan housing (Continued)

assembly, the air-throughflow part may be demounted from the opening, thereby facilitating taking out and cleaning the fan wheel.

13 Claims, 7 Drawing Sheets

(56) References Cited

U.S. PATENT DOCUMENTS

| | | | | |
|---|---|---|---|---|
| 7,632,340 | B2* | 12/2009 | Brady | ................ B01D 46/0005 55/471 |
| 2006/0157231 | A1* | 7/2006 | Han | ........................ F04D 17/04 165/121 |
| 2015/0159910 | A1 | 6/2015 | Huang et al. | |

FOREIGN PATENT DOCUMENTS

| | | | |
|---|---|---|---|
| CN | 105864066 A | | 8/2016 |
| CN | 205858742 U | * | 1/2017 |
| CN | 205858742 U | | 1/2017 |
| CN | 206175270 U | | 5/2017 |
| CN | 207526764 U | | 6/2018 |
| WO | 2016179890 A1 | | 11/2016 |

* cited by examiner

TOWER FAN HOUSING ASSEMBLY AND TOWER FAN

CROSS-REFERENCE TO RELATED APPLICATIONS

The present disclosure is a national stage application of International Patent Application No. PCT/CN2018/103383, filed on Aug. 31, 2018, which claims priority to Chinese Patent Application No. 201711050086.9, filed on Oct. 31, 2017, the contents of which are hereby incorporated by reference in their entirety.

TECHNICAL FIELD

The present disclosure relates to a technical field of household electric appliances, and in particular to a tower fan housing assembly and a tower fan.

BACKGROUND

A tower fan is a novel fan in the market at present, and mainly includes a base and a front housing and a rear housing mounted on the base. The front housing and the rear housing are fastened through a screw, and a fan wheel, a motor and other parts are accommodated in an accommodation space formed by the front housing and the rear housing. The tower fan is preferred by more and more consumers due to its unique columnar shape and small occupied area during use.

But, at present, when the tower fan is used for a period of time, a great deal of dust may be accumulated inside the fan wheel thereof. When the fan wheel rotates and starts blowing air, the dust accumulated in the fan wheel may be blown out with the air. The air at an air outlet has poor cleanliness, and is bad for health of the consumer. If a user cleans the fan wheel, the front housing and the rear housing need to be demounted to clean the fan wheel. In this way, the whole demounting may be time-consuming and laborious and influence the user's experience.

SUMMARY

A main purpose of the present disclosure is to provide a tower fan housing assembly and a tower fan, as to solve the problem in the conventional art that it is time-consuming and laborious when a user demounts a fan wheel in the tower fan for cleaning, and the user has frustrating experience.

For achieving the abovementioned purpose, the present disclosure provides a tower fan housing assembly, including a housing body and an air-throughflow part.

The housing body has an opening suitable for taking out a fan wheel inside the housing body.

The air-throughflow part is detachably mounted at the opening of the housing body.

In an exemplary embodiment, the opening is arranged on a rear housing of the housing body, and the air-throughflow part is a rear net close to an air inlet of the fan wheel.

In an exemplary embodiment, the opening is arranged on a front housing of the housing body, and the air-throughflow part is an air guiding part close to an air outlet of the fan wheel.

In an exemplary embodiment, the air-throughflow part is mounted on the housing body through a slide fastener structure.

In an exemplary embodiment, the tower fan housing assembly may further include a thread fastening structure disposed between the housing body and the air-throughflow part.

In an exemplary embodiment, an end of the air-throughflow part without the slide fastener structure is connected with the housing body through a clamping block in an inserting manner, and the other end is connected with the housing body through the thread fastening structure.

In an exemplary embodiment, the slide fastener structure may include a plurality of slide fasteners disposed on the air-throughflow part and a plurality of sliding tables which are disposed on the housing body and are in one-to-one correspondence with the plurality of slide fasteners. A catching groove is formed on each of the plurality of slide fasteners, and each of the sliding plurality of tables is driven to slide into the each of the plurality of catching grooves, as to connect the air-throughflow part and the housing body.

In an exemplary embodiment, a first segmented groove avoiding interference of the each of the plurality of slide fasteners is moulded at a corresponding position on the housing body, and the each of the plurality of sliding tables is formed on a side of the first segmented groove.

In an exemplary embodiment, an end of the each of the plurality of sliding tables facing a bottom of the catching groove is provided with a second segmented groove, and a depth of the second segmented groove is consistent with a thickness of the bottom of the catching groove.

In an exemplary embodiment, an end surface of an end of the each of the plurality of sliding tables facing a bottom of the catching groove cooperates with the bottom of the catching groove through a first wedge-shape face.

In an exemplary embodiment, a side of the each of the plurality of sliding tables vertical to an inserting direction that the each of the plurality of slide fasteners is inserted into the first segmented groove cooperates with a wall of the catching groove through a second wedge-shape face.

In an exemplary embodiment, the each of the plurality of slide fasteners and/or the each of the plurality of sliding tables is provided with a guiding face configured to guide a corresponding slide fastener to be fastened with a corresponding sliding table in a sliding manner.

The present disclosure further provides a tower fan, including a tower fan housing assembly. The tower fan housing assembly is the abovementioned tower fan housing assembly.

The technical solution of the present disclosure has the following advantages.

In the tower fan housing assembly and the tower fan provided by the present disclosure, the user only needs to demount the air-throughflow part from the opening when the dust is accumulated inside the fan wheel, namely, expose the opening suitable for taking out the fan wheel, as to facilitate taking out the fan wheel from the opening for cleaning. Compared with the solution in the conventional art that the front housing and the rear housing are demounted from the base, an operation is simplified and the user's experience is improved.

BRIEF DESCRIPTION OF THE DRAWINGS

In order to describe a specific embodiment of the present disclosure or the technical solution in the conventional art more clearly, the specific embodiment or drawings required to be used in description of the conventional art will be simply introduced below. It is apparent that the drawings described below are only some embodiments of the present disclosure. Other drawings may further be obtained by those of ordinary skill in the art according to these drawings without creative work. In the drawings.

Herein, the abovementioned drawings may include the following reference numbers:

10: Rear housing; 11: Opening; 13: Sliding table; 131: First segmented groove; 133: Second segmented groove; 134: First wedge-shape face; 135: Second wedge-shape face; 30: Rear net; 31: Slide fastener; 311: Guiding face; 313: Catching groove; 91: Clamping block; 92: Thread fastening structure.

DETAILED DESCRIPTION OF THE EMBODIMENTS

The technical solutions of the present disclosure will be clearly and completely described below in combination with drawings. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In the descriptions of the present disclosure, it is to be noted that orientation or position relationships indicated by terms "center", "upper", "lower", "left", "right", "upright", "horizontal", "inner", "outer" and the like are orientation or position relationships shown in the drawings, are adopted not to indicate or imply that indicated devices or components must be in specific orientations or structured and operated in specific orientations but only to conveniently describe the present disclosure and simplify descriptions and thus should not be understood as limits to the present disclosure. In addition, terms "first", "second" and "third" are only adopted for description and should not be understood to indicate or imply relative importance.

Embodiment 1

Figure 1:
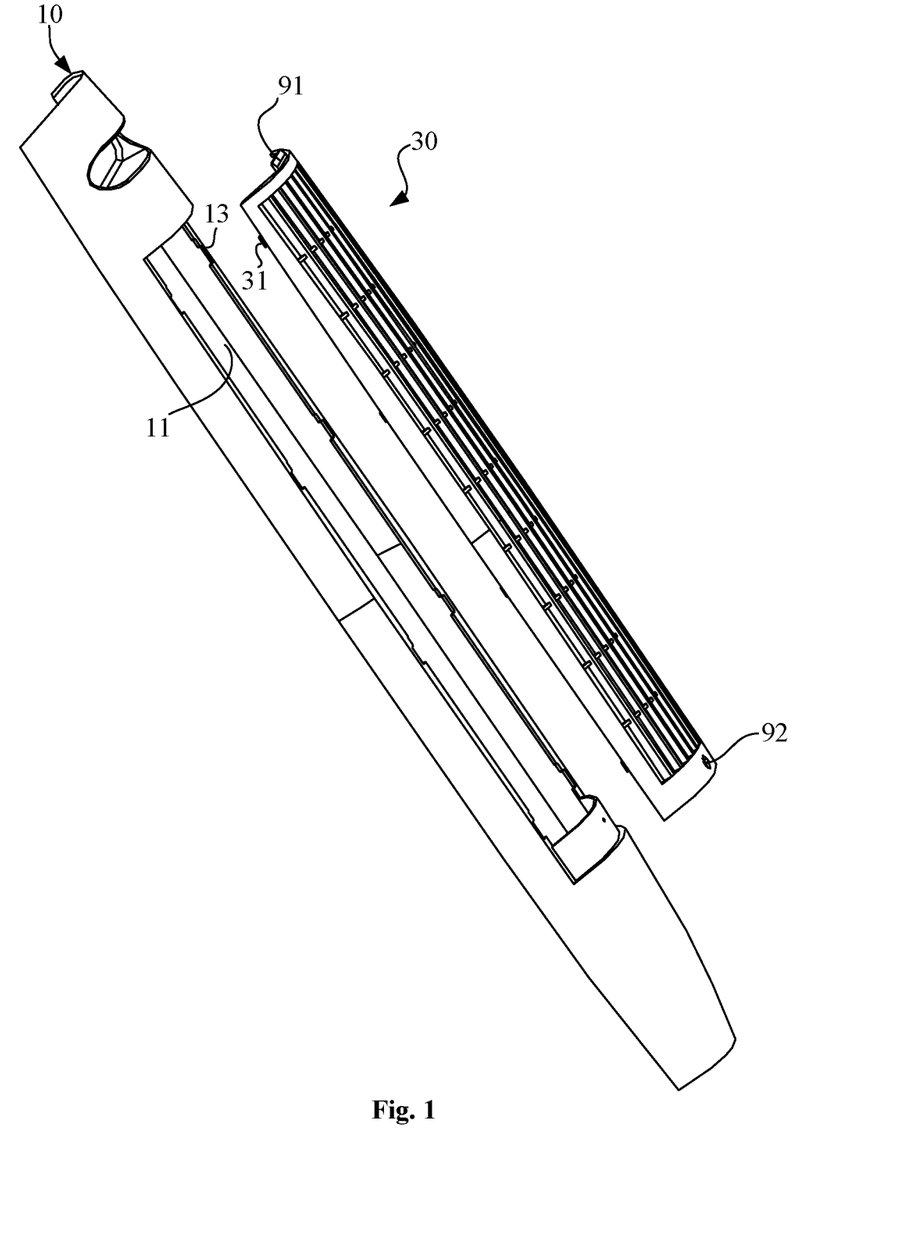
FIG. 1 is a schematic diagram of an assembling structure of a rear net and a rear housing of a tower fan housing assembly in an embodiment of the present disclosure.
Figure 2:
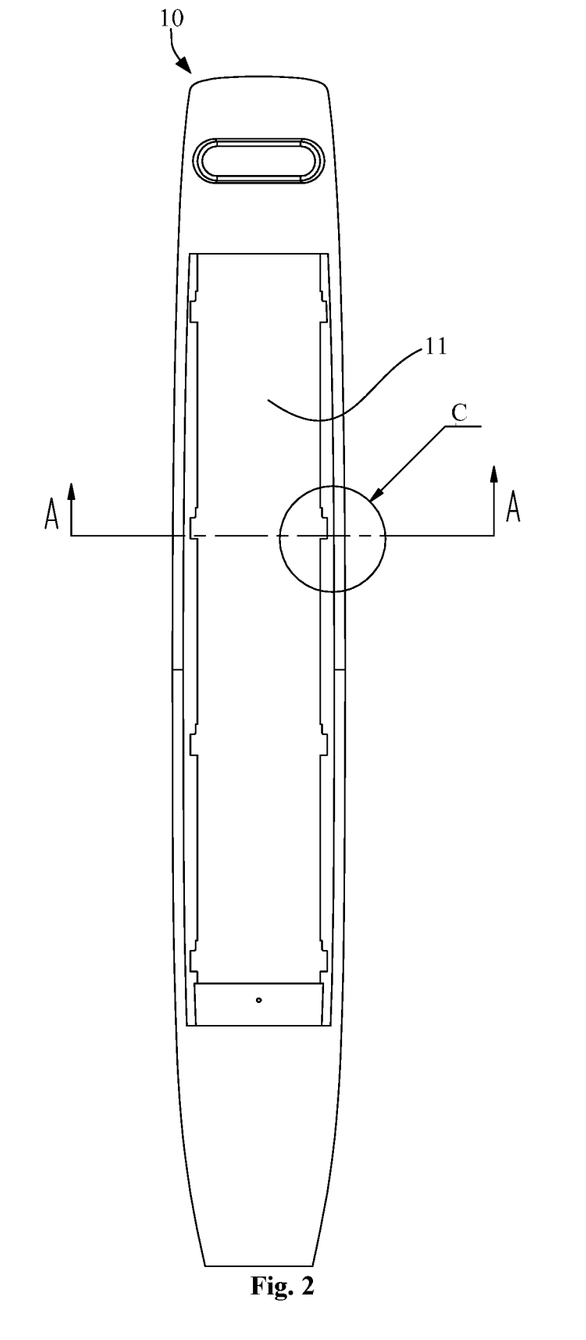
FIG. 2 is a structure diagram of a rear housing in a schematic diagram of an assembling structure shown in FIG. 1.
Figure 3:
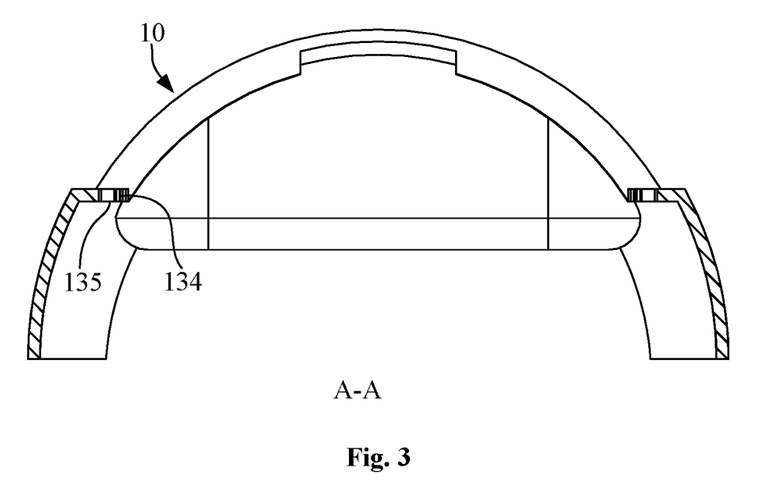
FIG. 3 is a structure diagram of a section view of a rear housing shown in FIG. 2 along an A-A direction.
Figure 4:
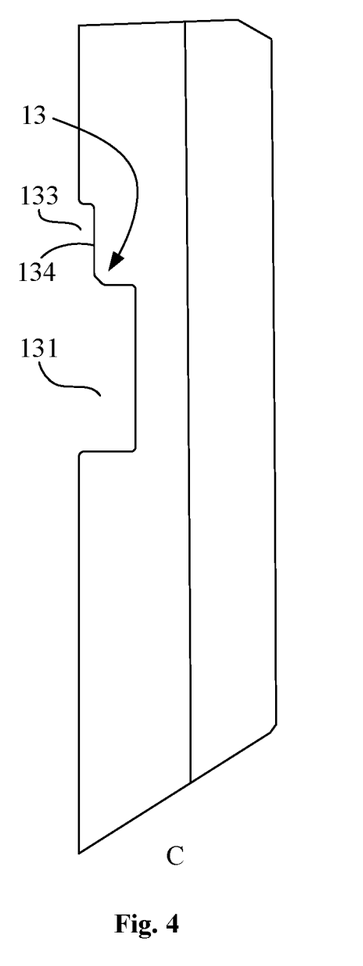
FIG. 4 is a schematic diagram of an amplified structure of a rear housing shown in FIG. 2 in a position C.
Figure 5:
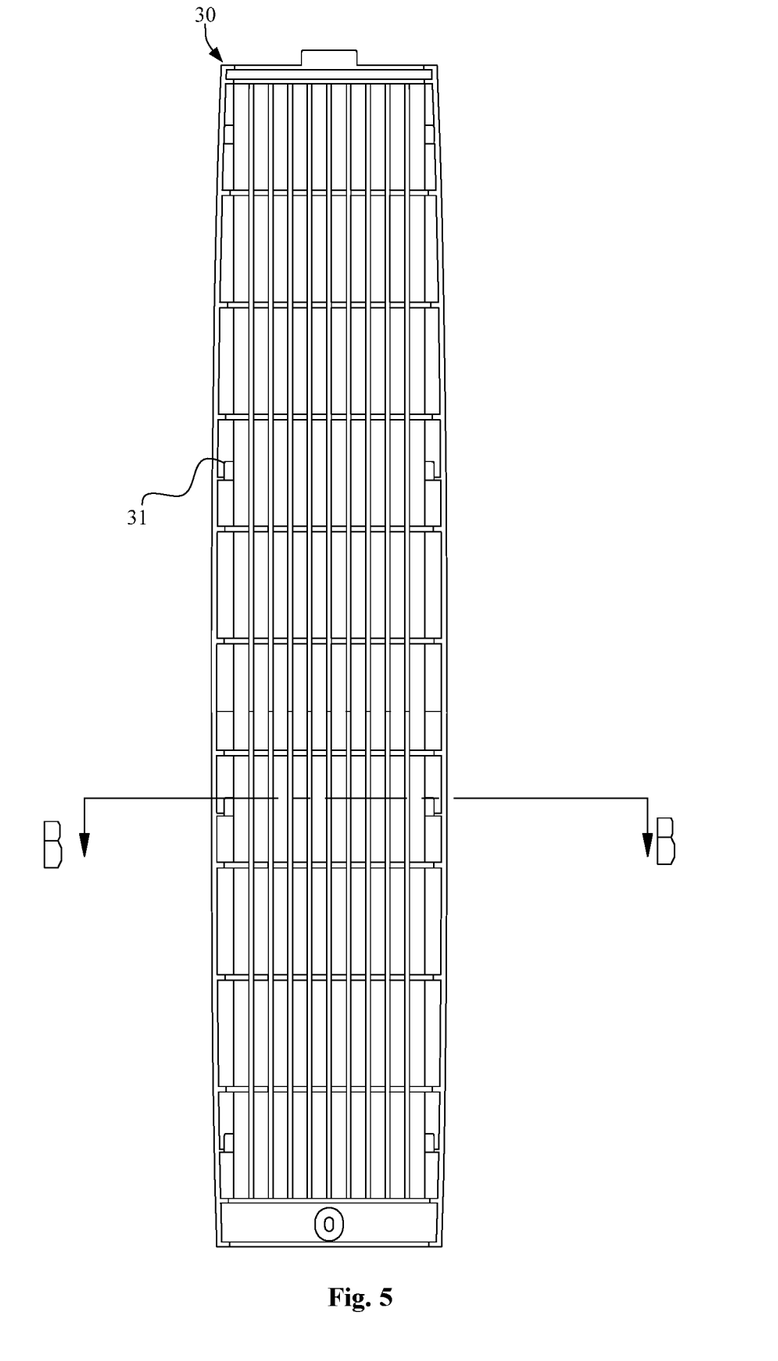
FIG. 5 is a structure diagram of a rear net in a schematic diagram of an assembling structure shown in FIG. 1.
Figure 6:
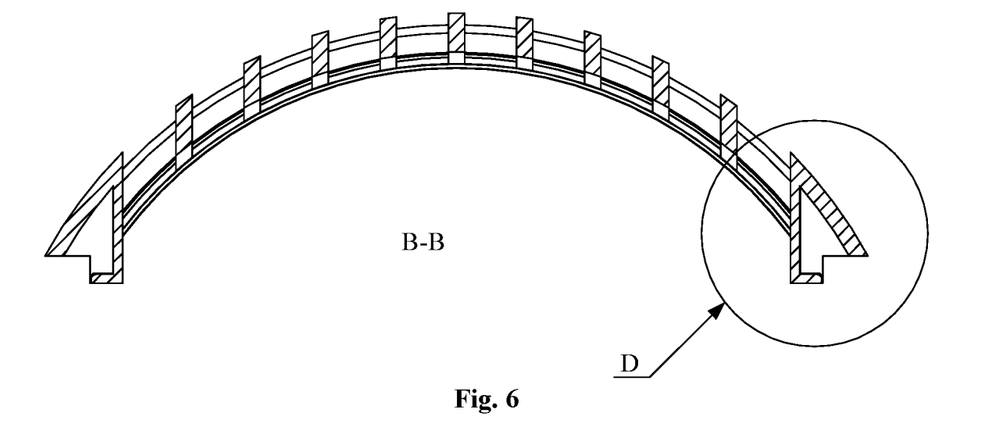
FIG. 6 is a structure diagram of a section view of a rear net shown in FIG. 5 along a B-B direction.
Figure 7:
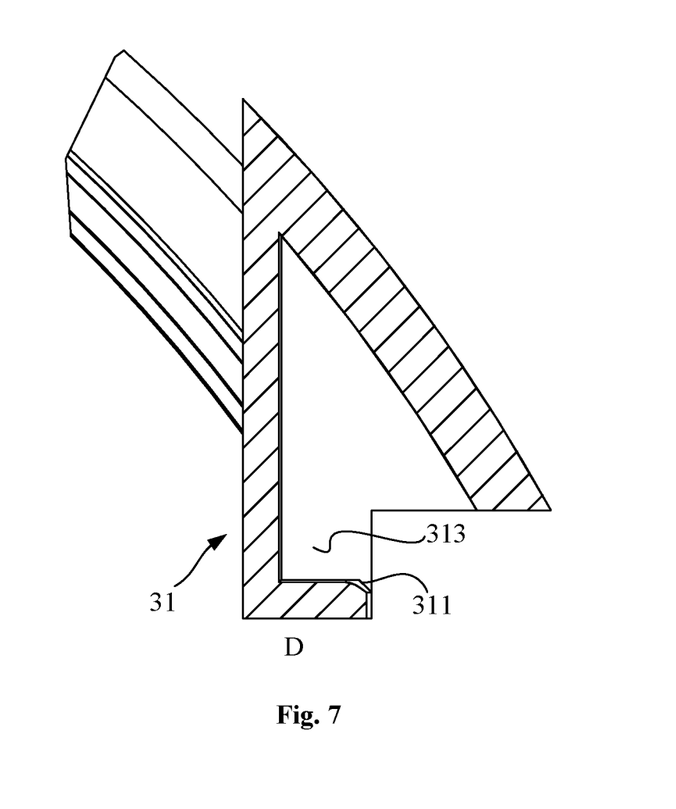
FIG. 7 is a schematic diagram of an amplified structure of a rear net shown in FIG. 6 in a position D.
Figure 8:
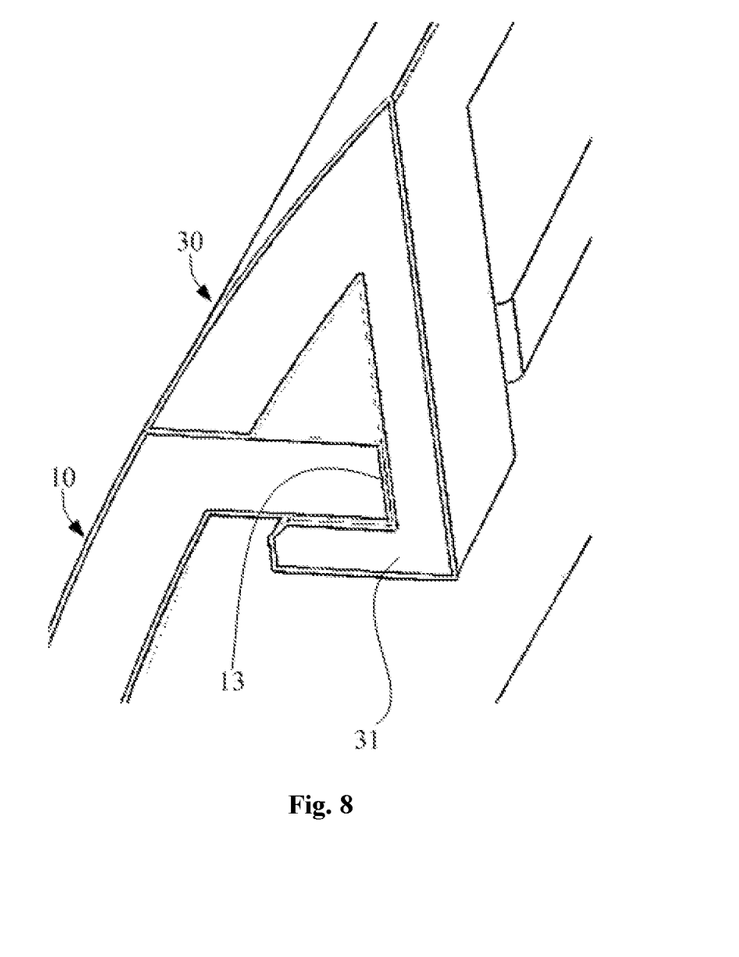
FIG. 8 is a structure diagram of a sliding table on a rear housing cooperating with a slide fastener on a rear net.

As shown in FIG. 1, a tower fan housing assembly in the embodiment may include a rear housing 10 taken as a housing body and having an opening 11 suitable for taking out a fan wheel in a tower fan, and a rear net 30 taken as an air-throughflow part and detachably mounted at the opening 11 of the housing body. During use, the rear net 30 may have an opening position of opening the opening 11 to suitably take out the fan wheel, and a closing position of closing the opening 11 to suitably make the fan wheel work normally. In this way, a user only needs to demount the rear net 30 from the opening 11 when dust is accumulated inside the fan wheel, namely, expose the opening 11 suitable for taking out the fan wheel, as to facilitate the user to take out the fan wheel from the opening 11 for cleaning. Compared with the solution in the conventional art that a front housing and a rear housing are demounted from a base, an operation is simplified and the user's experience is improved.

In an embodiment not shown, the tower fan housing assembly may include: the front housing having the opening 11 suitable for taking out the fan wheel in the tower fan, and an air guiding part detachably mounted at the opening 11 of the housing body. During use, the air guiding part may have an opening position of opening the opening 11 to suitably take out the fan wheel, and a closing position of closing the opening 11 to suitably make the fan wheel to work normally. In this way, the user only needs to demount the air guiding part from the opening 11 when the dust is accumulated inside the fan wheel, namely, expose the opening 11 suitable for taking out the fan wheel, as to facilitate the user to take out the fan wheel from the opening 11 for cleaning. Compared with the solution in the conventional art that the front housing and the rear housing 10 are demounted from the base, the operation is simplified and the user's experience is improved.

By referring to FIG. 2 to FIG. 8, quick mounting and demounting of the rear net 30 and the rear housing 10 in the embodiment are achieved through a slide fastener structure, and accordingly the air-throughflow part is demounted. In this way, the air-throughflow part may be quickly demounted, the operation of demounting the fan wheel for cleaning is simplified, and the user's experience is further improved accordingly.

Specifically, the slide fastener structure may include multiple slide fasteners 31 disposed on the air-throughflow part and multiple sliding tables 13 which are disposed on the housing body and are in one-to-one correspondence with the slide fasteners 31. A catching groove 313 is formed on the slide fasteners 31, and the sliding table 13 is driven to slide into the catching groove 313 when the slide fasteners 31 fit the sliding tables 13, in this way connection of the air-throughflow part with the housing body is achieved. A whole mounting and demounting process is simple and convenient, the demounting of the fan wheel is simplified, and the user's experience is further improved.

Preferably, a first segmented groove 131 avoiding interference of the slide fastener 31 is moulded at a corresponding position on the housing body in the embodiment, and the sliding table 13 is formed on a side of the first segmented groove 131. In this way, interference between the rear net 30 and the rear housing 10 may be avoided during mounting, and achievability of the slide fastener structure may be improved.

An end of the sliding table 13 facing a bottom of the catching groove 313 is provided with a second segmented groove 133, and a depth of the second segmented groove 133 is consistent with a thickness of the bottom of the catching groove 313. In this way, mounting and fitting between the slide fastener 31 and the sliding table 13 is facilitated to achieve, and mounting convenience of mounting the rear net 30 and the rear housing 10 is improved.

Preferably, an end surface of an end of the sliding table 13 facing a bottom of the catching groove 313 fits the bottom of the catching groove 313 through a first wedge-shape face 134. In this way, the first wedge-shape face 134 may be extruded during completely mounting the housing body and the air-throughflow part and during inter-sliding of the slide fastener 31 and the sliding table 13, accordingly the rear net 30 may be ensured to closely fit the rear housing 10 in an extruding direction of the first wedge-shape face 134. Moreover, the rear net 30 is conveniently demounted, and the rear net 30 after mounting is more stable.

Preferably, a side of the sliding table 13 vertical to an inserting direction that the slide fastener 31 is inserted into the first segmented groove 131 fits a wall of the catching groove 313 through a second wedge-shape face 135, accordingly the rear net 30 may be ensured to closely fit the rear housing 10 in an extruding direction of the second wedge-shape face 135. Moreover, the rear net 30 is conveniently demounted, and stability of the rear net 30 after mounting is further improved.

Preferably, the tower fan housing assembly may further include a thread fastening structure 92 disposed between the housing body and the air-throughflow part. In this way, during mounting the rear housing 10 and the rear net 30 and after mounting the slide fastener 31, the thread fastening structure 92 is taken to fasten, for example, fix in a nailing mode. Accordingly, stability of mounting the rear net 30 may be improved, and the tower fan may be ensured to work smoothly. In view of reduction of subsequent demounting, one screw may be configured only.

Preferably, the rear net 30 has four end surfaces, herein two ends fit with each other through the slide fastener structure. As an alternative, an end of the rear net 30 without the slide fastener structure is connected with the housing body through a clamping block 91 in an inserting manner, and the other end without the slide fastener structure is connected with the housing body through the thread fastening structure 92. In this way, the stability of the rear net 30 after mounting is further improved.

Preferably, the slide fastener 31 and/or the sliding table 13 is provided with a guiding face 311 configured to guide the slide fastener 31 to fit the sliding table 13. In this way, it is conducive to fitting of the slide fastener 31 and the sliding table 13, and smoothness during mounting the air-throughflow part is improved, and the user's experience is improved.

The demounting and the mounting of the fan wheel in the embodiment will be described below in combination with FIG. 2-FIG. 8.

During demounting the fan wheel in the embodiment, a thread fastener needs to be unscrewed only, then the rear net 30 is pushed, namely, the opening 11 of the detachable rear net 30 is exposed, and the fan wheel is taken out from the opening 11.

During mounting the fan wheel in the embodiment, the rear net 30 needs to be placed inward only, then the rear net 30 is pushed, in this way the fitting between the rear net 30 and the rear housing 10 in presence of the slide fastener may be achieved. Then fastening of the rear net 30 may be achieved by screwing up the screw.

Embodiment 2

The embodiment further provides a tower fan, including a tower fan housing assembly. The tower fan housing assembly is the abovementioned tower fan housing assembly. Thus, the tower fan in the embodiment should have all advantages that of the tower fan housing assembly, and these advantages will not be elaborated one by one herein.

It is apparent that the abovementioned embodiments are merely examples made for clear description, but are not intended to limit the embodiments. Other changes or modifications of different forms may further be made by those of ordinary skill in the art on the basis of the abovementioned description. Not all embodiments are needed to be and may not be enumerated herein. Obvious changes or modifications derived herefrom still fall within the scope of protection of the present disclosure.

What is claimed is:

1. A tower fan housing assembly, comprising:
a housing body, comprising an opening (11) suitable for taking out a fan wheel inside the housing body; and
an air-throughflow part, detachably mounted at the opening (11) of the housing body;
wherein, the air-throughflow part is mounted on the housing body through a slide fastener structure;
wherein, the slide fastener structure comprises a plurality of slide fasteners (31) disposed on the air-throughflow part and a plurality of sliding tables (13) which are disposed on the housing body and are in one-to-one correspondence with the plurality of slide fasteners (31); a catching groove (313) is formed on each of the plurality of slide fasteners (31); and each of the plurality of sliding tables (13) is driven to slide into the each of the plurality of catching grooves (313), as to connect the air-throughflow part and the housing body;
wherein, a first segmented groove (131) avoiding interference of the each of the plurality of slide fasteners (31) is moulded at a corresponding position on the housing body, and the each of the plurality of sliding tables (13) is formed on a side of the first segmented groove (131);
wherein, an end of the each of the plurality of sliding tables (13) facing a bottom of the catching groove (313) is provided with a second segmented groove (133), and a depth of the second segmented groove (133) is consistent with a thickness of the bottom of the catching groove (313).

2. The tower fan housing assembly as claimed in claim 1, wherein, the opening is arranged on a rear housing (10) of the housing body, and the air-throughflow part is a rear net (30) close to an air inlet of the fan wheel.

3. The tower fan housing assembly as claimed in claim 1, wherein, the opening is arranged on a front housing of the housing body, and the air-throughflow part is an air guiding part close to an air outlet of the fan wheel.

4. The tower fan housing assembly as claimed in claim 1, wherein, the tower fan housing assembly further comprises a thread fastening structure (92) disposed between the housing body and the air-throughflow part.

5. The tower fan housing assembly as claimed in claim 1, wherein, an end of the air-throughflow part without the slide fastener structure is connected with the housing body through a clamping block (91) in an inserting manner, and the other end is connected with the housing body through a thread fastening structure (92).

6. The tower fan housing assembly as claimed in claim 1, wherein, an end surface of an end of the each of the plurality of sliding tables (13) facing a bottom of the catching groove (313) cooperates with the bottom of the catching groove (313) through a first wedge-shape face (134).

7. The tower fan housing assembly as claimed in claim 1, wherein, a side of the each of the plurality of sliding tables (13) vertical to an inserting direction that the slide fastener (31) is inserted into the first segmented groove (131) cooperates with a wall of the catching groove (313) through a second wedge-shape face (135).

8. The tower fan housing assembly as claimed in claim 1, wherein, the each of the plurality of slide fasteners (31) is provided with a guiding face (311) configured to guide a corresponding slide fastener (31) to be fastened with a corresponding sliding table (13) in a sliding manner, or the each of the plurality of sliding tables (13) is provided with a guiding face (311) configured to guide a corresponding slide fastener (31) to be fastened with a corresponding sliding table (13) in a sliding manner; or the each of the plurality of slide fasteners (31) and the each of the plurality of sliding tables (13) is provided with a guiding face (311) configured to guide a corresponding slide fastener (31) to be fastened with a corresponding sliding table (13) in a sliding manner.

9. A tower fan, comprising a tower fan housing assembly, wherein, the tower fan housing assembly
is the tower fan housing assembly as claimed in claim 1.

10. The tower fan as claimed in claim 9, wherein, the opening is arranged on a rear housing (10) of the housing body, and the air-throughflow part is a rear net (30) close to an air inlet of the fan wheel.

11. The tower fan as claimed in claim 9, wherein, the opening is arranged on a front housing of the housing body, and the air-throughflow part is an air guiding part close to an air outlet of the fan wheel.

12. The tower fan as claimed in claim 9, wherein, the tower fan housing assembly further comprises a thread fastening structure (92) disposed between the housing body and the air-throughflow part.

13. The tower fan as claimed in claim 9, wherein, an end of the air-throughflow part without the slide fastener structure is connected with the housing body through a clamping block (91) in an inserting manner, and the other end is connected with the housing body through a thread fastening structure (92).

\* \* \* \* \*